Inventor
J. G. Linn
by
Attorney

Patented Feb. 8, 1944

2,341,505

UNITED STATES PATENT OFFICE 2,341,505

REGULATING SYSTEM

James G. Linn, West Allis, Wis., assignor to Allis-Chalmers Manufacturing Company, Milwaukee, Wis., a corporation of Delaware Application August 3, 1940, Serial No. 350,382

13 Claims. (Cl. 171—312)

This invention relates in general to regulating systems and particularly to a system in which an electrical quantity is regulated by means of a magnetically actuated regulator.

In prior art regulating systems where an electrical characteristic of a large dynamo-electric machine is regulated, the magnetic regulator may be sufficiently large so that the inertia of moving parts is relatively great. The inertia of the moving parts in large regulators may be sufficient to decrease the accuracy of the regulator. It is desirable therefore to utilize a means for accelerating actuation of the regulator which will be operable in either direction of operation and which will not impair the sensitivity or the ruggedness of the regulator.

It is therefore an object of the present invention to provide a magnetically operated regulator with an accelerating means that will avoid the above disadvantages.

It is also an object of the present invention to provide a magnetically operated regulator with an accelerating means responsive to the rate of change of the regulated quantity.

Figure 1:
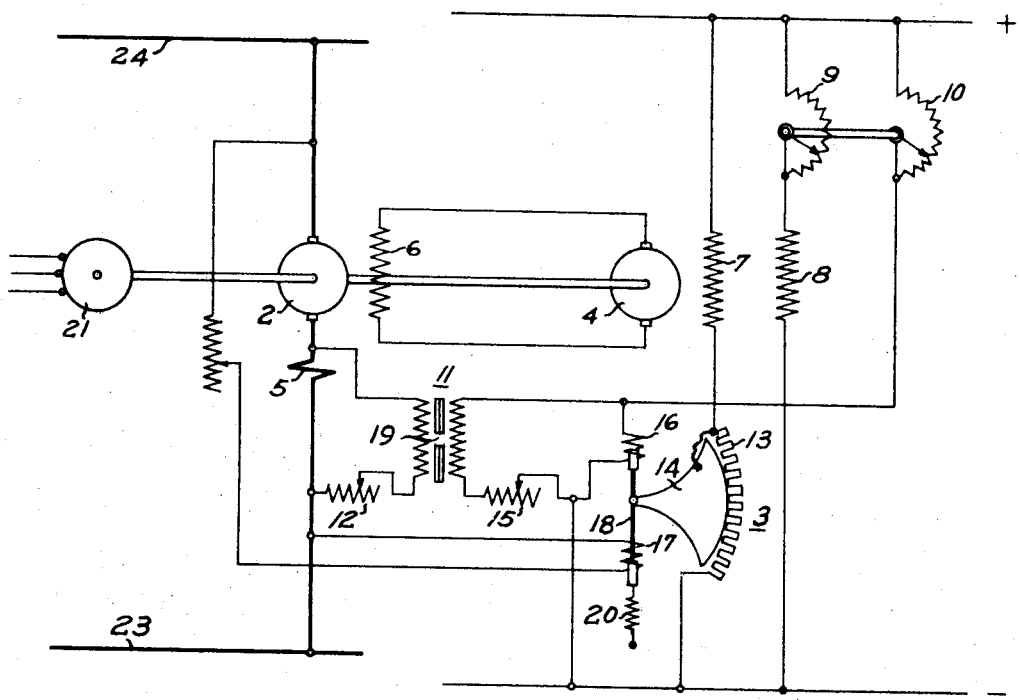
Figure 2:
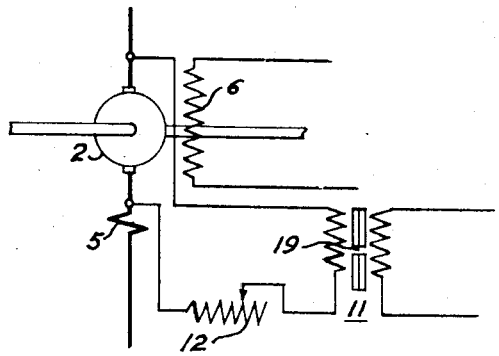

Objects and advantages other than those above set forth will be apparent from the following description when read in connection with the accompanying drawing, in which:

Fig. 1 is a schematic diagram of connections of a regulating system embodying the present invention; and Fig. 2 is a diagram of connections illustrating a modification of the embodiment shown in Fig. 1.

In Fig. 1 of the drawing, a dynamo-electric machine 2 is regulated by a magnetically operated regulator 3 by field control of an exciter 4 energizing the field 6 of the machine 2. The regulator 3 has a rocking contact sector 14 actuated by the movable contact member 18 to increase or decrease the amount of resistance 13 in series with the field 7 of the exciter 4.

The movable member 18 is actuated by the main coil 17 of the regulator which is connected responsively to the voltage across the regulated machine 2. The movable member 18 is also provided with an adjusting coil 16 which is connected in series with a voltage adjusting rheostat 10 across a constant direct current source of supply. The ampere turns of the adjusting coil 16 act cumulatively with those of main coil 17 to pull the movable member 18 upwardly against the bias of gravity or a spring 20. The main field 8 of the exciter 4 is controlled by a rheostat 9 in tandem with the adjusting rheostat 10. The machine 2 and the exciter 4 may be directly connected as shown to an alternating current motor 21, and the machine 2 may be connected to lines 23, 24 which may be a supply source or a load circuit.

In order to accelerate the regulator 3 in accordance with the rate of change of the regulated quantity, an accelerating transformer 11 is connected with one winding across the interpole winding 5 of the machine 2 and with the other winding connected across the adjusting coil 16. In order to prevent saturation of the transformer 11 an air gap 19 is introduced in the core thereof. Due to the exciting current for the air gap, the transformer output is limited by the amount of resistance in the primary winding and the primary winding may therefore be of considerably lower resistance than for normal design. Adjustable resistances 12 and 15 are utilized to control the amount of acceleration provided by transformer 11.

With the connections of the transformer 11 as shown, on the occurrence of a load change on the machine 2, the change in voltage across the interpole winding 5 induces a voltage in the transformer 11. If the change is due to a load increase, the induced secondary voltage of the transformer 11 is of such polarity that it decreases the ampere turns of the adjusting coil 16 and therefore the total ampere turns of the regulator. This will result in movement of member 18 downwardly to increase the current in field 7, thereby increasing the excitation of machine 2 to compensate for the increased load. Without accelerating action of transformer 11, due to the insensitivity of the regulator, the regulated voltage must change beyond the sensitivity band before producing regulator action to restore voltage to normal. Utilizing the accelerating transformer 11, the regulator 3 is forced into action before the change in voltage actuates the moving member 18 by change in the energization of the main coil 17. This action of the accelerating transformer 11 not only improves the sensitivity, but it provides an increase in sensitivity which increase is proportional to the rate of change of the generator load.

If the change in generator load is a decrease, the voltage applied to adjusting coil 16 by the transformer 11 is in the opposite direction and acts to cause movement of member 18 upwardly to decrease the excitation of the machine 2. The accelerating kick obtained from transformer 11 may be applied to a separate coil affecting the moving member 18, rather than being applied to the adjusting coil 16 as shown.

While the transformer 11 is shown connected in Fig. 1 so as to be responsive to the rate of change in load current of the machine 2, it may be connected as shown in Fig. 2 so as to be directly responsive to the rate of change in voltage. In Fig. 2, the transformer 11 is shown connected across the armature of the machine 2 rather than across the interpole winding 5 as shown in Fig. 1. The connections of the embodiment shown in Fig. 2 are in other respects similar to those shown in Fig. 1. Although the machine 2 has been illustrated as a generator supplying circuit conductors 23, 24, it may as well be a motor connected to conductors 23, 24 of a supply source. In the illustrated embodiments of the invention the regulator 3 is shown as controlling an electrical characteristic of the dynamo electric machine 2. However, the invention herein is applicable to a magnetically operated regulator for controlling any electrical characteristic. The terms "regulator" and "regulating system" as used herein define a device and system operable, upon change in the value of an electrical characteristic, to return such characteristic to its desired value independently of whether such change is an increase or a decrease.

Although but two embodiments of the present invention have been illustrated and these and other embodiments have been described, it will be apparent to those skilled in the art that various changes and modifications may be made therein without departing from the spirit of the invention or from the scope of the appended claims.

It is claimed and desired to secure by Letters Patent:

1. In a system for regulating an electrical quantity, a magnetically operable regulator comprising a means variable to effect a change in said electrical quantity, means responsive to said regulated quantity for actuating said regulator, and means responsive to the rate of change of said regulated quantity for accelerating said actuation of said regulator.

2. In a system for regulating an electrical quantity, a magnetically operable regulator comprising a resistance variable to effect a change in said electrical quantity, a first winding on said regulator connected responsively to said electrical quantity, and a second winding on said regulator positioned and connected so that the effect thereof on the actuation of said regulator is cumulative relative to the effect of said first winding and is responsive to the rate of change of said regulated quantity.

3. In a regulating system, a dynamo-electric machine, means for controlling a characteristic of said dynamo-electric machine comprising a magnetically operated regulator responsive to a change in said characteristic and cumulatively responsive to the rate of change in said characteristic.

4. In a regulating system, a dynamo-electric machine, a magnetically operable regulator provided with a resistance connected in circuit with a field of said machine, a first winding on said regulator connected across the armature of said machine, and a second winding on said regulator positioned and connected so that the effect thereof on the actuation of said regulator is cumulative relative to the effect of said first winding and is responsive to the rate of change of armature current in said machine.

5. In a regulating system, a dynamo-electric machine, a field winding for said machine, a variable resistance in circuit with said field winding, means for varying said resistance in response to a change in voltage across the armature of said machine, and means for accelerating actuation of said resistance varying means in response to the rate of change of armature current in said machine.

6. In a regulating system, a dynamo-electric machine, a field winding for said machine, a variable resistance in circuit with said field winding, means for varying said resistance in response to a change in voltage across the armature of said machine, and means for accelerating actuation of said resistance varying means in response to the rate of change of armature current in said machine, said accelerating means comprising a transformer responsive to the rate of change of said armature current.

7. In a regulating system, a dynamo-electric machine, a field winding for said machine, a variable resistance in circuit with said field winding, means for varying said resistance comprising a magnetically operable device provided with a winding connected responsively to the armature voltage of said machine, a second winding on said device for adjusting the total steady-state ampere turns supplied by both said windings, and a transformer provided with a primary winding connected responsively to the current in the armature of said machine and a secondary winding connected to said second winding on said device.

8. In a regulating system, a generator, a field winding thereon, a magnetically operated regulator for said field winding comprising a coil connected responsively to the voltage of said generator, and means for accelerating actuation of said regulator in proportion to the rate of change of load current of said regulator.

9. In a regulating system, a generator, a field winding thereon, a magnetically operated regulator for said field winding comprising a coil connected responsively to the voltage of said generator, and means for accelerating actuation of said regulator, said means comprising a transformer connected between said regulator and the armature circuit of said generator.

10. In a regulating system, a generator, a field winding thereon, a magnetically operated regulator for said field winding comprising a coil connected responsively to the voltage of said generator, and means for accelerating actuation of said regulator, said means comprising a second coil on said regulator and a transformer provided with an air gap in the core thereof, a primary winding connected responsively to the armature current of said generator and a secondary winding connected to said second coil.

11. In a regulating system, a dynamo-electric machine, a field winding for said machine, a variable resistance in circuit with said field winding, means for varying said resistance in response to a change in voltage across the armature of said machine, and means operable independently of whether said voltage change is an increase or a decrease in said voltage for increasing the sensitivity of said regulator.

12. In a regulating system, a dynamo-electric machine, a field winding for said machine, a variable resistance in circuit with said field winding, means for varying said resistance in response to a decrease in voltage across the armature of said machine, and means for increasing the sensitivity of said regulator, said means comprising a transformer reponsive to the rate of decrease of armature current in said machine.

13. In a regulating system, a generator, a field winding thereon, a magnetically operated regulator for said field winding comprising a coil connected responsively to the voltage of said generator, and means for increasing the sensitivity of said regulator in proportion to the rate of change of load current of said regulator and independently of whether said load current is increasing or decreasing.

JAMES G. LINN.